United States Patent [19]

Perrin et al.

[11] Patent Number: 4,969,482
[45] Date of Patent: Nov. 13, 1990

[54] EMERGENCY FUEL SHUT-OFF VALVE

[75] Inventors: Michael W. Perrin, Short Hills; Nicholas R. Clew, Summit; Lewis E. Zarr, Franklin, all of N.J.

[73] Assignee: Flodyne Controls, Inc., Murray Hill, N.J.

[21] Appl. No.: 278,619

[22] Filed: Dec. 1, 1988
(Under 37 CFR 1.47)

[51] Int. Cl.⁵ .................... F16K 17/14; F16K 17/40
[52] U.S. Cl. ...................................... 137/76; 137/77; 137/80; 251/291
[58] Field of Search ................ 137/67, 68.1, 71, 75, 137/77, 79, 80, 556, 76; 251/73, 291

[56] References Cited

U.S. PATENT DOCUMENTS

| | | | |
|---|---|---|---|
| 1,746,801 | 2/1930 | Sieben | 137/77 |
| 1,771,716 | 7/1930 | Lovekin | 137/77 |
| 1,814,577 | 7/1931 | Heimbold | 137/77 |
| 1,924,868 | 8/1933 | Lovekin | 137/77 X |
| 2,484,940 | 10/1949 | Franzheim | 137/77 |
| 2,613,683 | 10/1952 | Baird et al. | 137/68.1 |
| 2,665,714 | 1/1954 | Greenwood | 137/77 X |
| 2,673,707 | 3/1954 | McRae | 137/68.1 X |
| 2,719,533 | 10/1955 | Smith | 137/80 |
| 2,775,978 | 1/1957 | Bunnell et al. | 137/80 |
| 2,920,638 | 1/1960 | Heckethorn et al. | 137/68.1 |
| 3,166,084 | 1/1965 | Handley | 137/77 |
| 3,245,257 | 4/1966 | Anderson | 251/291 X |
| 3,382,888 | 5/1968 | Mueller et al. | 251/291 X |
| 3,747,618 | 7/1973 | Boes | 137/80 |
| 3,958,592 | 5/1976 | Wells et al. | 137/77 X |
| 4,706,850 | 11/1987 | Remaks | 251/291 X |

OTHER PUBLICATIONS

Advertisement of Omco, Inc.; "Omco Swivel Type Fire Valve with Positive Gas Shut Off" brochure, date unknown.
Advertisement of Omco Inc.; "Omco Flanged Type Fire Valve" brochure, date unkown.
Essex Fluid Controls, "During a Raging Fire Who Turns Off Fire Safe valves?", date unknown.

Primary Examiner—John Rivell
Attorney, Agent, or Firm—Lerner, David, Littenberg, Krumholz & Mentlik

[57] ABSTRACT

A reusable emergency gas shutt-off valve for terminating the supply of fuel to a dwelling is adapted for fluid pressure actuation at a location outside of the dwelling, manual actuation on the valve itself, and thermal actuation from heat in the vicinity of the valve or via a signal received from a temperature-sensing device at a location remote from the valve. The valve is resettable only by utilizing a specially-constructed reloading tool.

39 Claims, 6 Drawing Sheets

EMERGENCY FUEL SHUT-OFF VALVE

BACKGROUND OF THE INVENTION

The present invention relates generally to in-line fuel valves, and more particularly to emergency fuel shut-off valves for terminating the supply of fuel to a dwelling in the event of an emergency such as a fire, or in the event of non-payment, such termination being activated by authorized personnel from outside the dwelling.

Fires in apartment and office dwellings have always been of great concern, not only because of the danger to the many inhabitants in such dwellings, but also because of the danger presented to the firemen and other personnel fighting the fire. In buildings of all sizes, fires weaken supporting structures so that firemen often risk being crushed by collapsing floors and walls. More dangerous, however, is the problem presented by the leaking of fuel, such as natural gas, from gas lines and gas appliances which have been damaged by the fire. Oftentimes, such leaking gases become trapped in an isolated area to form large gas pockets. These gas pockets are easily ignited by the flames of the fire or damaged electrical appliances, thus causing large explosions within a burning building.

A less emergent but economically important problem is that of terminating the supply of fuel to a dwelling for non-payment. When such termination requires access to the interior of a dwelling, gas company personnel have often been refused such access so they could carry out their responsibilities. A further problem is that of the building owner or other individual restoring the supply of gas to a dwelling after the gas company has terminated the same by reason of non-payment, condemnation, or an emergency. This could, of course, be dangerous because the individual effecting the restoration of the gas supply is often not trained or licensed to inspect the gas supply system.

It has therefore become desirable and often mandated by safety regulations, to provide a system for terminating the supply of fuel to an apartment or office dwelling. A system of this type should preferably be adaptable for modifying existing dwellings as well as for use in dwellings under construction. Ideally, such a system would include a curbside access so that authorized personnel could terminate the supply of fuel from the main supply line to the main service in the dwelling without having to enter the dwelling. Many newer dwellings were constructed to include systems such as curb valves for shutting off the gas supply in the event of an emergency, nonpayment or condemnation. However, such curb valves, as well as other systems provided in newer buildings, do not include backup features so that the system is failsafe if curbside actuation is rendered impossible by unforeseen or unavoidable events. Thus, it is preferable that an emergency shut-off system would also provide alternate means for terminating the supply of fuel to the dwelling in the event that such termination cannot be effected at the curbside access.

With respect to the problem of unauthorized restoration of the supply of gas, a gas termination system of the type considered herein would preferably provide restoration means which could be successfully utilized only by authorized personnel.

More relevant to the present invention is the installation of an emergency fuel shut-off system in older dwellings. The time, expense and risk of digging up the street and sidewalk to expose gas service lines so that a curb valve or valve tee could be installed has prompted building owners to employ other methods of modifying older dwellings.

Thus, the foregoing demonstrates that a reusable emergency gas shut-off valve adapted to be installed in existing dwellings or dwellings under construction so that the fuel supply to the dwelling can be shut off from a substantially tamper-proof curbside access is warranted. Such an emergency gas shut-off valve should be easy and inexpensive to install, obviating the need to and risk of digging up the street and sidewalk to provide a curb valve or curb tee. It should also include a visual indicator and backup features so that the fuel supply can be shut off by means other than the curbside access.

SUMMARY OF THE INVENTION

The present invention specifically relates to a reusable emergency gas shut-off valve for terminating the supply of fuel to a dwelling whereby the valve is actuated by authorized personnel at a location outside the dwelling. The reusable shut-off valve of the present invention includes a valve body connectable in a fuel supply line between a main fuel supply and the main service in the dwelling, a fuel conduit extending through said valve body for delivering fuel to the main service in the dwelling, a valve housing connected to the valve body, a normally open valve member disposed within the valve housing, the normally open valve member being adapted to permit fuel to pass freely through the fuel conduit of the valve body when in an open position and to obstruct the fuel conduit of the valve body when in closed position so that fuel cannot pass through the fuel conduit to the fuel meter or main service in the dwelling. The normally open valve member is movable from the open position to the closed position by fluid pressure which is supplied to the reusable shut-off valve from a location remote from the reusable shut-off valve and the main service of the dwelling.

The reusable shut-off valve in accordance with the present invention is also equipped with a combined visual indicator/manual actuator which serves to provide a visual indication of whether the normally open valve member is in the open position or in the closed position and also as a means of manually moving the normally open valve member by striking the same with sufficient impact. The fluid pressure required to move the normally open valve member can also be adapted to respond to a signal provided from a temperature-sensing device or other means provided in an area inside the dwelling but remote from the reusable shut-off valve and the main service.

Finally, a failsafe mechanism is provided in the form of a shear element which must be structurally or thermally destroyed before the normally open valve member can move from the open position to the closed position. This shear element is constructed so as to structurally fail upon being subjected to a predetermined degree of pressure, whether it be by virtue of the fluid pressure in the case of fluid pressure actuation or the shock force in the case of the impact or manual actuation. The failsafe feature of the reusable shut-off valve resides in the thermal properties of the shear element which causes the shear element to fail at a predetermined temperature. Thus, if all else fails in actuating the movement of the normally opened valve member from the open to the closed position, direct heat from a fire in the vicinity of the reusable shut-off valve will cause the shear element to fail whereby the normally open valve will move from the open position to the closed position to shut off the supply of fuel to the main service of the dwelling.

Accordingly, it is an object of the present invention to provide an emergency gas shut-off valve which is easily installed in existing dwellings to provide a system for terminating the supply of fuel to the dwelling from the outside thereof or a location within the dwelling which is remote from the valve, the valve being substantially tamper-proof and being reusable after a simple reloading process.

It is another object of the present invention to provide an emergency gas shut-off valve for terminating the supply of fuel to a dwelling from an area, inside or outside, remote from the shut-off valve having a shear element which must be structurally or thermally destroyed prior to the closing of the valve, the structural destruction being prompted either by fluid pressure being delivered to the emergency gas shut-off valve or by striking a manual actuator on the emergency gas shut-off valve, and the thermal destruction of the shear element being prompted by a predetermined temperature level being reached in the vicinity surrounding the emergency gas shut-off valve.

It is another object of the present invention to provide an emergency gas shut-off valve for terminating the supply of gas to a dwelling from a location remote from the emergency gas shut-off valve and including means for actuating the closing of the valve upon receiving a signal from a temperature-sensing device or other means located in another area inside the dwelling.

It is yet another object of the present invention to provide a reusable emergency gas shut-off valve which, after actuation, can only be reset for use by a specially constructed reloading tool.

BRIEF DESCRIPTION OF THE DRAWINGS

The above and other objects of the present invention will become apparent, as will a better understanding of the concepts underlying the present invention, by reference to the description which follows and refers to the accompanying drawings in which.

DETAILED DESCRIPTION

Figure 1A:
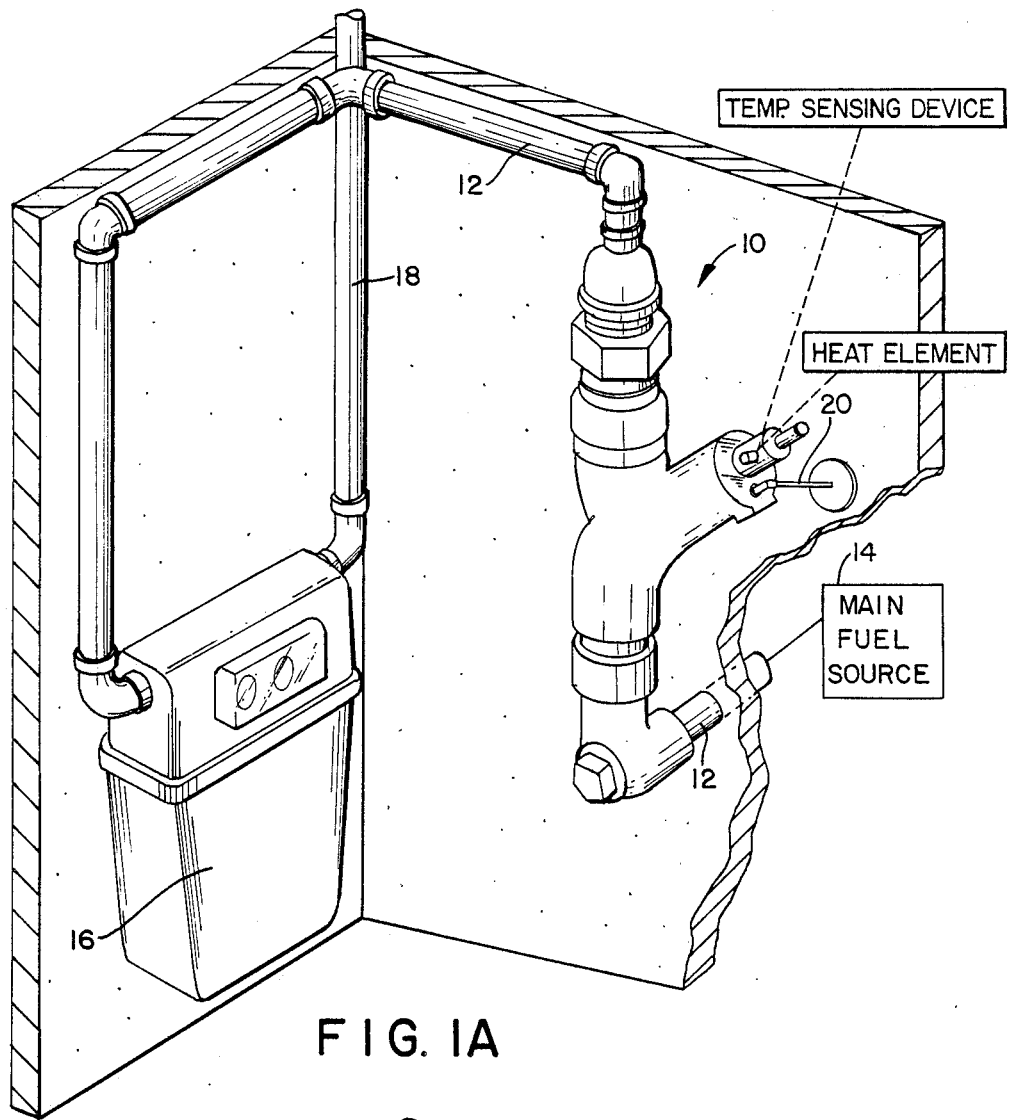
FIG. 1A is a perspective view of the corner portion of a basement in a dwelling, showing an emergency gas shut-off valve in accordance with the present invention being connected in the gas service line from the street to the gas meter for the dwelling.
Figure 1B:
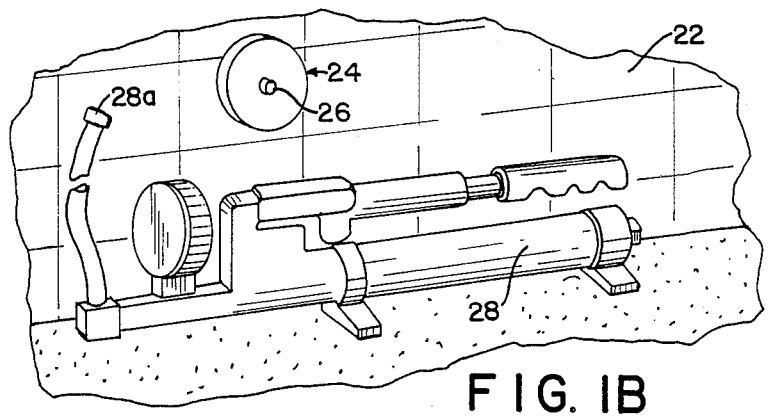
FIG. 1B is an elevational view of a portion of a wall of the dwelling, showing the curbside access for use in conjunction with the emergency gas shut-off valve of the present invention and a hydraulic hand pump which is connectable to the nipple of the curbside access to deliver fluid pressure to actuate the emergency gas shut-off valve of the present invention.
Figure 4:
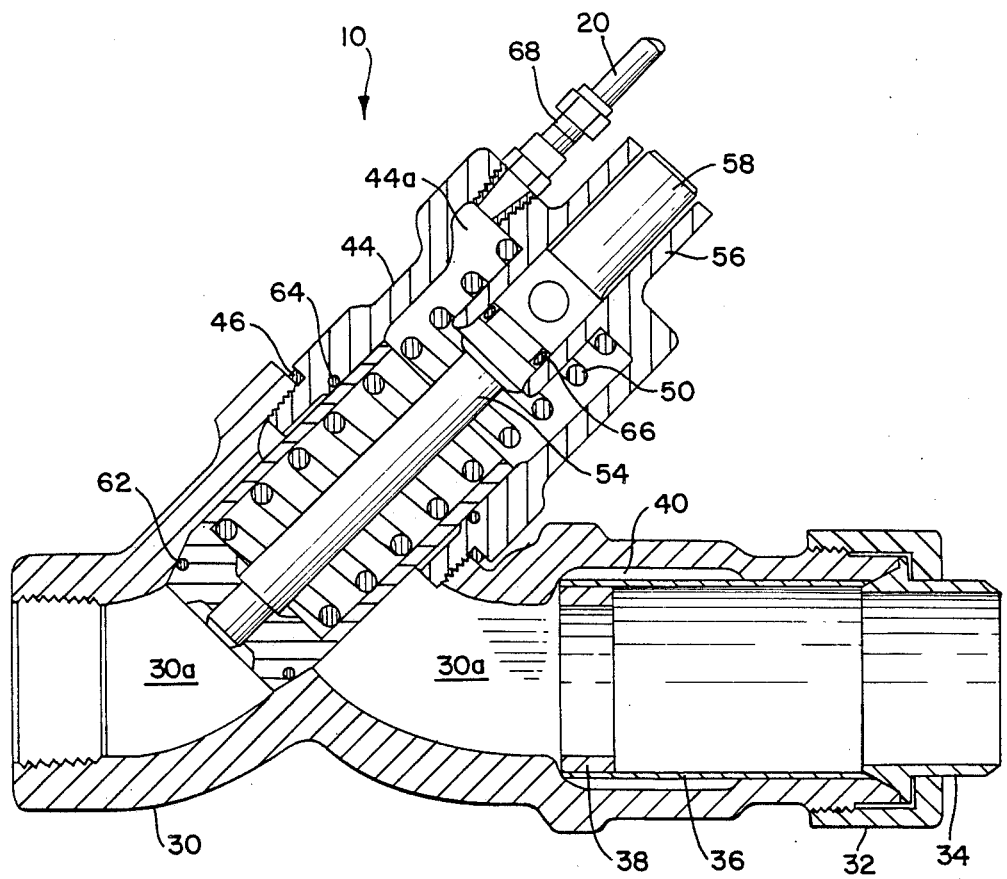
FIG. 4 is an elevational view, in cross-section, of the emergency gas shut-off valve in accordance with the present invention, showing the valve member in the closed position.
Figure 5:
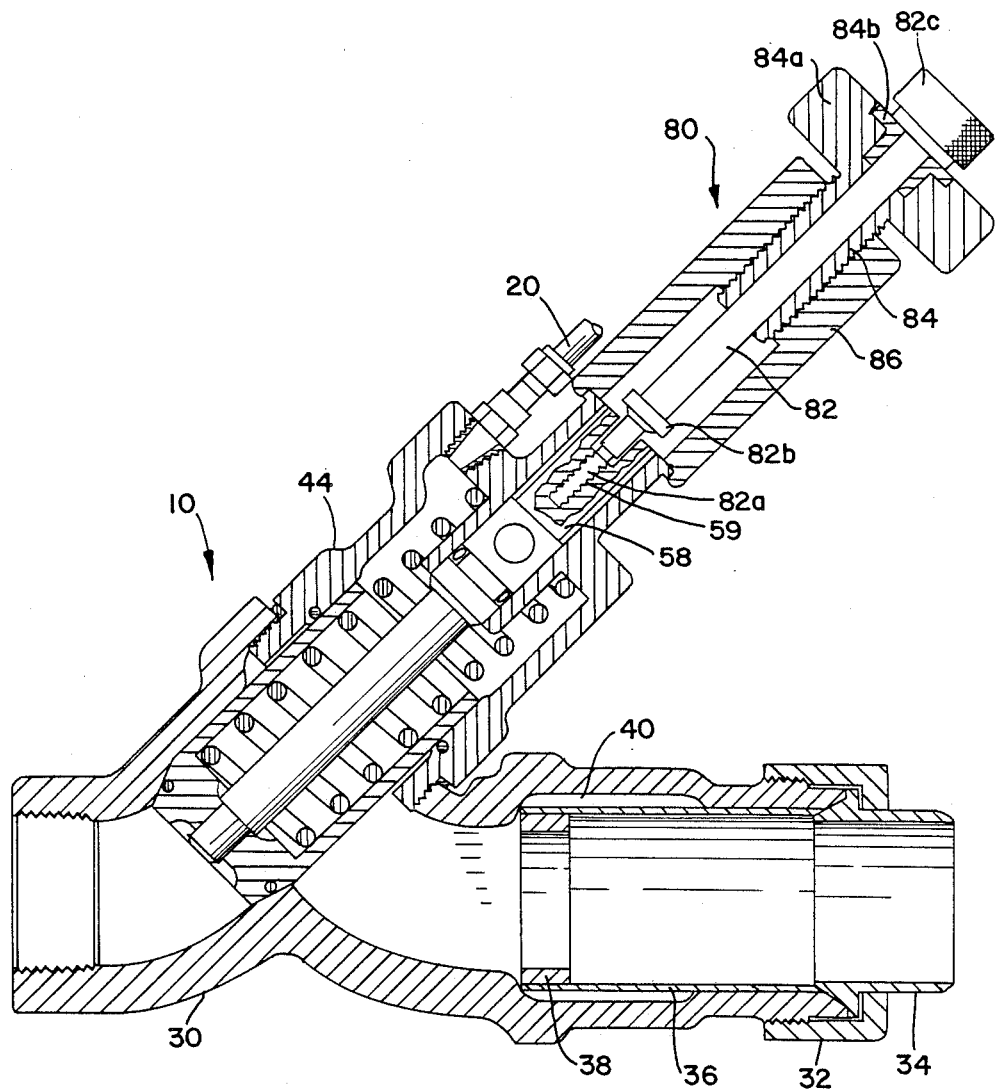
FIG. 5 is an elevational view, in cross-section, of the emergency gas shut-off valve in accordance with the present invention and a reloading tool, showing the valve member in the closed position and the reloading tool in position for reloading the valve member.
Figure 6:
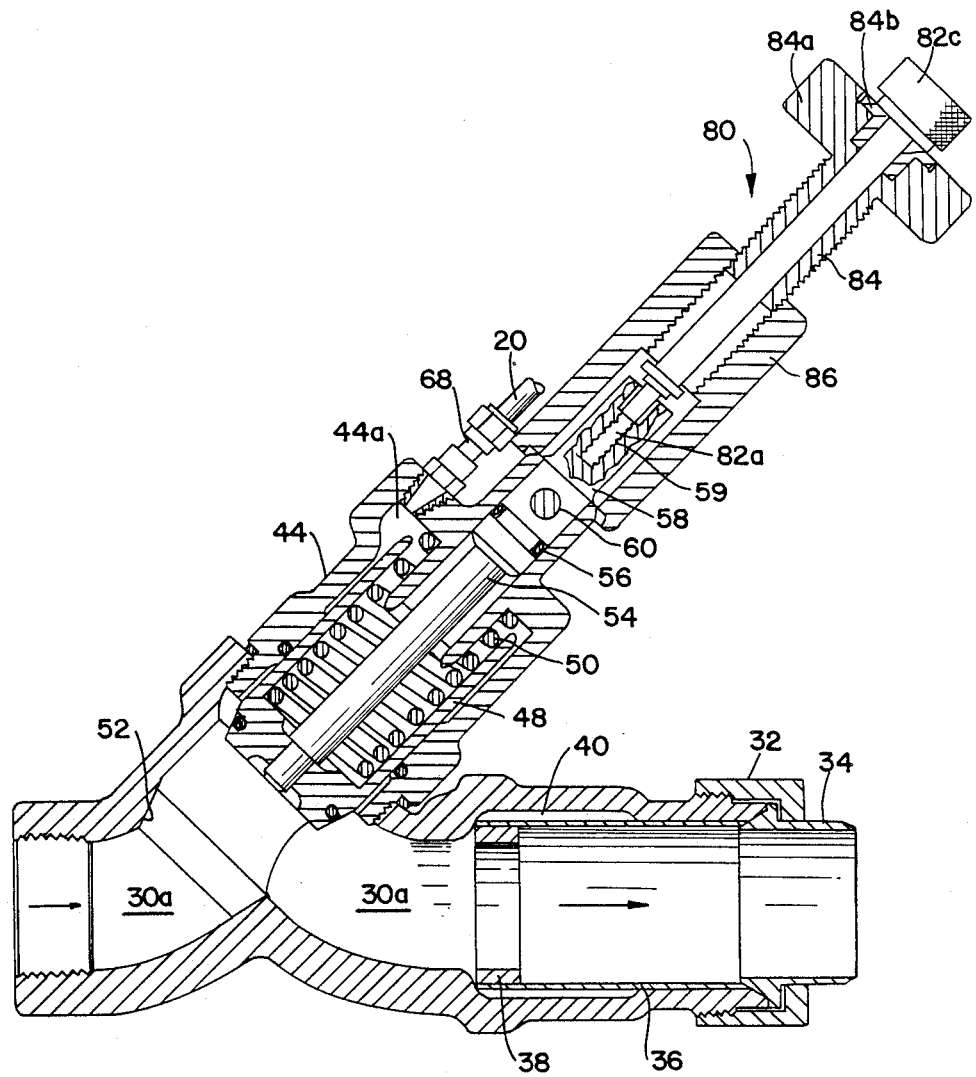
FIG. 6 is an elevational view of the emergency gas shut-off valve in accordance with the present invention and a reloading tool, showing the valve member as it has been reloaded to the open position by the reloading tool

Referring to the figures, FIGS. 1A and 1B illustrate the emergency gas shut-off valve generally designated as 10 in accordance with the present invention as part of an emergency gas shut-off system in an office or apartment dwelling. FIGS. 2–6 show the structure and operation of the emergency gas shut-off valve 10, FIGS. 5 and 6 illustrating the reloading of the emergency gas shut-off valve 10 by a custom reloading tool.

Thus, FIG. 1A shows the emergency gas shut-off valve 10 connected in a gas service line 12 entering the basement of a dwelling from the street to furnish the dwelling with gas from a main fuel source 14. It is important to note that the shut-off valve 10 is connected in the gas service line 12 prior to the gas meter 16 of the dwelling which regulates and measures the gas being provided to the various areas of the dwelling via the house line 18. The shut-off valve 10 is desirably the first component of the gas system entering the dwelling so as to protect other components of the gas system which are highly susceptible to fire damage, such as the gas meter. A fluid pressure line 20 is connected to the shut-off valve 10 and extends to the exterior wall 22 of the dwelling where the fluid pressure line 20 terminates at a curbside access 24 having an exterior nipple 26, as shown in FIG. 1B. The exterior nipple 26 is adapted to receive connector 28a of hand pump 28 once a protective nipple covering on the exterior nipple 26 is removed. Such a protective nipple covering could be constructed in any suitable substantially tamper-proof manner, such as an arrangement requiring a key or specially-constructed tool to expose the exterior nipple 26 or a unitary covering member which must be snipped with a large pair of bolt cutters. In this manner, the possibility that vandals or other unauthorized personnel will tamper with the exterior nipple 26 (and thus the shut-off valve 10) will be greatly reduced. The hand pump 28 or any other suitable means is employed to provide fluid pressure through fluid pressure line 20 so as to actuate the shut-off valve 10 as described hereinafter.

Of course, any suitable pressure delivery means may be provided for use in connection with the shut-off valve 10. For instance, it may be feasible to employ a compressor having a quick disconnect coupling for connection to a mated coupling at the curbside access 24 whereby a compressed fluid would be delivered, via fluid pressure line 20, to actuate the shut-off valve 10 and thereby terminate the supply of fuel from the main fuel source 14 to the gas meter 16.

It is thus readily apparent that the supply of fuel to a dwelling equipped with the emergency gas shut-off system shown in FIGS. 1A. and 1B can be terminated instantly by activating the emergency gas shut-off valve 10 from the curbside access 24. As discussed above, such a system serves to save life and property in the event of an emergency. Such a system is also highly advantageous to the gas supply companies since the curbside access 24 enables gas company personnel to terminate the supply of fuel to a dwelling should the building owner neglect to pay the fuel bill and the gas company personnel are refused entry to the dwelling. In this regard, the emergency gas shut-off valve 10 will be equipped with resetting means, discussed below, so that the resetting of the valve to an open position must be effected by gas company personnel.

Figure 2:
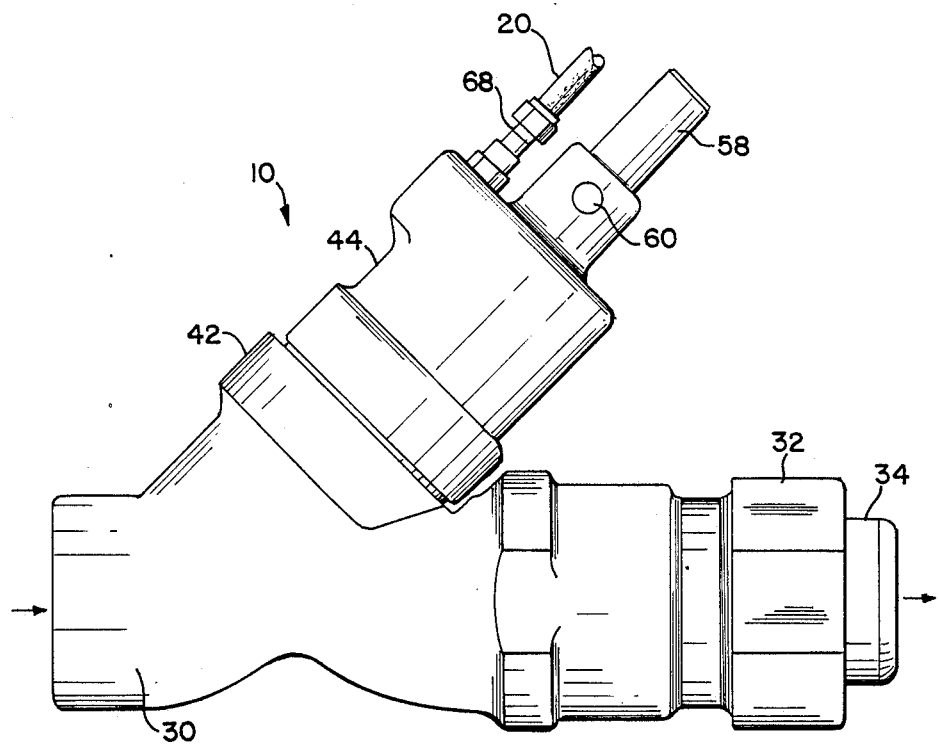
FIG. 2 is an elevational view of the emergency gas shut-off valve in accordance with the present invention.
Figure 3:
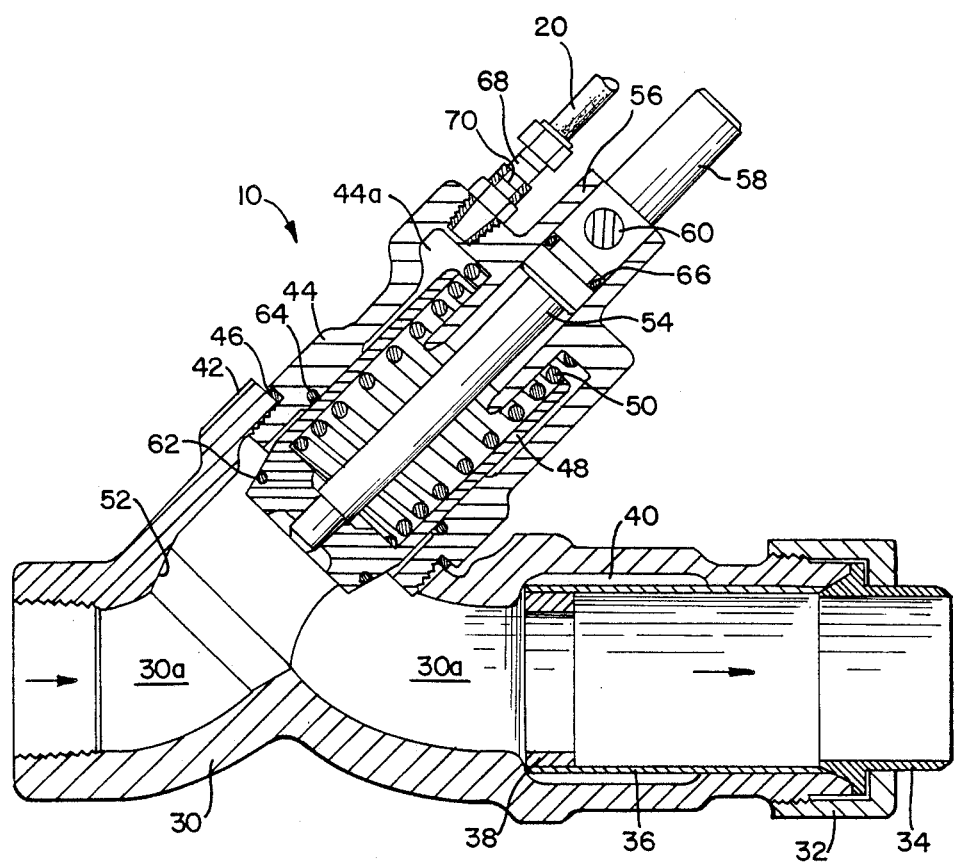
FIG. 3 is an elevational view, in cross-section, of the emergency gas shut-off valve in accordance with the present invention, showing the valve member which is spring-loaded in the open position.

Reference to FIGS. 2 and 3 reveals that the emergency gas shut-off valve 10 includes a valve body 30 having a fuel conduit 30a extending between two ends which are adapted for in-line connection to the gas service line 12. The arrows in FIGS. 2 and 3 indicate the intended direction of fuel flow from the main fuel source 14 to the gas meter 16. Thus, the downstream end of the valve body 30, that is, the end closest to the gas meter 16 is a compression-type fitting including compression nut 32 and insulating gasket 34 made of any suitable material such as rubber. A cylindrical insulator 36, preferably made of polypropylene or the like, and an annular insulator 38, preferably made of rubber or the like, are also provided in the fuel conduit 30a of valve body 30 directly adjacent to the insulating gasket 34. This insulation arrangement is provided so that the shut-off valve 10 and the pipe on the street side of the gas service line 12 are electrically isolated from the pipe on the dwelling side of gas service line 12. By so insulating the shut-off valve 10, the shut-off valve 10 can be retrofit in a gas service line in the place of existing insulated couplings, such as DRESSER insulated couplings. FIG. 3 also shows an annular spacing 40 between the valve body 30 and the cylindrical insulator 36. This annular spacing is provided so that the pipe-end which is telescopically arranged within the insulating gasket 34 and the cylindrical insulator 36, and abutted against the annular insulator 38, can undergo a small degree of deflection without damaging the pipe connection between the gas service line 12 and the shut-off valve 10.

The valve body 30, preferably made of steel or iron, also includes a valve port 42 which includes female threading for receiving the male threading of valve housing 44. A gasket 46, made of a copper alloy or the like, is provided between the valve housing 44 and the valve port 42 so as to provide a gas-tight seal therebetween. A valve member 48 is disposed within valve housing 48 for movement from a spring-loaded open position, as shown in FIGS. 3 and 6, to a closed position as shown in FIGS. 4 and 5. The valve member 48 is a generally cup-shaped member which is preferably made of a stainless steel material or other corrosion-resisting material. A helical spring 50 is provided within the valve member 48 to bear at one end against the bottom interior surface of the valve member 48 and at the other end against the top interior surface of the valve housing 44, thereby normally urging the valve member 48 towards the valve seat 52 provided beneath the valve port 42 in the fuel conduit 30a of the valve body 30. A piston rod 54 is connected at one end to the bottom of the valve member 48 and extends longitudinally through a sleeve 56 of the valve housing 44. The piston rod 54 includes at its top end a combined visual indicator/manual actuation member, hereinafter described as strike pin 58. The spring 50 and piston rod 54 are also preferably made of a noncorrodible material such as stainless steel.

A shear pin 60 is inserted through aligned transverse openings in the sleeve 56 and the piston rod 54 to maintain the valve member 48 in the open position against the biasing force of the spring 50. It is particularly noted that in this open position, the strike pin 58 extends beyond the sleeve 56 of the valve housing 44 to thus indicate the open position of the valve member 48. When the valve member 48 is in the closed position, the top of the strike pin 58 will be substantially flush with the top of the sleeve 56, as shown in FIGS. 4 and 5.

The primary function of the shear pin 60 is to hold the valve member 48 in the open position against the biasing force of the spring 50 until the shear pin 60 is intentionally fractured by one of the valve actuating means provided in accordance with the present invention. The shear pin 60 must, therefore, be constructed so as to withstand the biasing force of the spring 50, as determined by its K constant, which urges the valve member 48 towards the closed position shown in FIG. 4. Consistent with the objects of the present invention, however, the shear pin 60 must be adapted to be removed from the aligned transverse openings of the sleeve 56 and piston rod 54 or, as in the preferred embodiment of the present invention, adapted to be fractured when sufficient fluid pressure is applied against the valve member 48 or sufficient impact is imparted on the strike pin 58. Because it is also desirable that the shear pin 60 be thermally destroyed or weakened (so that the biasing force of the string 50 could effect the fracturing thereof), the choice of appropriate materials is somewhat limited.

In the preferred embodiment of the present invention, the shear pin 60 is made from ULTEM 1000 (a trademark of General Electric) which is essentially a polyetherimide plastic. The ULTEM 1000 material has been tested and evaluated to determine its durability for use in connection with the life and property-saving gas shut-off system of the present invention. It has thus been determined that the ULTEM 1000 plastic will remain safe and effective for at least 50 years under the conditions in which the shut-off valve 10 will be used. In this context, a shear pin having a diameter of approximately three-eighths ($\frac{3}{8}$) of an inch and made from an ULTEM 1000 plastic will fail structurally when subjected to a fluid pressure of approximately 1500 psi and a shock force of approximately 19 foot pounds. The ULTEM 1000 plastic is constructed, however, so as to become thermally destroyed or weakened at temperatures just below 400° F., for instance, at approximately 380° F. This thermal failure feature of the shear pin 60 provides a failsafe mechanism for the emergency gas shut-off system in accordance with the present invention. Thus, if all other means provided for actuating the valve should fail, direct heat from a fire in the vicinity of the emergency gas shut-off valve 10 would cause the shear pin 60 to fail thereby releasing the spring-loaded valve member 48 to move to the closed position in which the supply of gas to the gas meter 16 would be terminated. It is imperative to note that the failure of the shear pin 60 by direct heat from a fire should occur prior to the thermal destruction of the various seals provided in the valve 10.

It is important to note that several gaskets and O-ring seals are provided on the valve housing 44 and the valve member 48. Each of these gaskets and O-ring seals must be made of materials which can withstand the environment in which the emergency gas shut-off valve 10 will operate and might possibly be exposed to in the event of fire in the vicinity of the shut-off valve 10, for instance a rubber-based material capable of withstanding 500° F. in a nonoxidizing environment. The O-rings should also exhibit a high resistance to corroding or becoming brittle over time. Thus, the valve member 48 includes an O-ring seal 62 disposed in an annular groove provided on the tapered end of the valve member 48. This O-ring seal 62 provides a gas-tight seal between the tapered end of the valve member 48 and the valve seat 52 when the valve member 48 is in the closed position as shown in FIG. 4. The valve housing 44 includes an O-ring seal 64 disposed in an interior annular groove adjacent to the female threaded portion of the valve housing 44. This O-ring seal 64 provides a gas-tight seal to prevent gas from entering the housing chamber 44a when the valve member 48 is in the open position, as shown in FIG. 3, and to prevent the fluid in the housing chamber 44a from escaping to the fuel conduit 30a when the valve member 48 is in the closed position, as shown in FIG. 4. The piston rod 54 also includes an O-ring seal 66 in an annular groove about the strike pin 58 just below the transverse opening for the shear pin 60. The O-ring seal 66 provides an at least fluid-tight seal between the piston rod 54 and the sleeve 56 of the valve housing 44 so that fluid in the housing chamber 44a cannot escape the valve housing 44 via the sleeve 56.

A fluid fitting 68 is connected to the top of the valve housing 44 for connection to the fluid pressure line 20 as shown in FIG. IA. FIG. 3 shows a fluid fitting 68 in partial cross-section to illustrate the burst disk 70 which blocks the passage from the fluid pressure line 20 to the housing chamber 44a. In the preferred embodiment, burst disk 70 is adapted, as could any other suitable means, to default at a pressure of approximately 1,000 psi. Thus, prior to the introduction of fluid pressure in the housing chamber 44a, a fluid pressure of approximately 1,000 psi must be exerted on burst disk 70. The burst disk 70 serves as a redundant hermetic seal to prevent the possibility of fuel escaping into the fluid pressure line 20. It also may serve to prevent vandals from gaining access to the exterior nipple 26 on the curbside access 24 located outside of the dwelling and utilizing a bicycle pump or the like in an attempt to actuate the shut-off valve 10.

As noted earlier, the shut-off valve 10 in accordance with the present invention can be easily installed in an existing dwelling or a dwelling under construction. Should an emergency such as a fire occur in a dwelling so equipped and it is desirable to terminate the supply of fuel to the dwelling, a fireman, policeman, building owner or other authorized personnel can actuate the shut-off valve 10 by striking the strike pin 58 with a hammer or other blunt instrument. When struck with sufficient impact, the strike pin 58 will structurally destroy shear pin 60, thus enabling the spring 50 to move the valve member 48 into the closed position where the tapered end of the valve member 48 is properly seated within the valve seat 52. If, however, an authorized individual cannot safely enter the area in which the shut-off valve 10 is located, the shut-off valve 10 can be actuated at the curbside access 24. Indeed, it may be desirable to utilize the curbside access from the outset since unforeseen dangers could arise while attempting to manually actuate the shut-off valve 10.

The curbside actuation of the shut-off valve 10 is easily accomplished by removing the protective nipple covering to expose the exterior nipple 26. As shown in FIG. 1B, the connector 28a of a hand pump 28 can be connected to the exterior nipple 26 so that fluid pressure can be delivered to the shut-off valve 10 via the fluid pressure line 20. Preferably, the working fluid utilized in conjunction with the emergency gas shut-off valve system of the present invention is a hydraulic oil. Thus, hand pump 28 can be a hydraulic hand pump capable pumping oil from an oil source to exert a pressure in the order of 3,000 psi on the valve member 48. Once a pressure of about 1,000 psi is delivered through the fluid pressure line 20 and into the fluid fitting 68, the burst disk 70 will fail, permitting oil to enter and fill the housing chamber 44a. Upon the continued pumping of the hand pump 28, fluid pressure is exerted against the spring-loaded valve member 48 until shear pin 60 fractures as explained above. This may also occur at about 1000 psi. The fracturing of the shear pin 60 will release the valve member 48 whereupon the spring 50 will exert a biasing force to move the valve member 48 from the open position shown in FIG. 3 to the closed position shown in FIG. 4. The shut-off valve 10 of the present invention is adapted to indicate its actuation to the operator of the hand pump 28. Thus, once a pressure of approximately 3000 psi, or any other predetermined pressure is indicated on the pressure dial, the operator of the hand pump 28 can be certain that the shut-off valve 10 has been properly actuated.

If, for any reason, curbside actuation of the shut-off valve 10 cannot be accomplished or has failed to close the spring-loaded valve member 48, the strike pin 58 serves as a visual indicator to a fire fighter who can then manually actuate the shut-off valve 10 by striking the strike pin 58.

As noted above, the shut-off valve 10 is constructed so as to be failsafe. Thus, if curbside actuation and manual actuation of the shut-off valve 10 is not accomplished, the shear pin 60 will become thermally destroyed or weakened by the direct heat of a fire in the vicinity of the shut-off valve 10.

Finally, an automated shut-off valve 10 is envisioned within the scope of the present invention. One such automation feature which can be provided for use in connection with the shut-off valve 10 includes a temperature-sensing device provided in an area of the dwelling which is remote from the shut-off valve 10. The temperature-sensing device can be provided in main hallways on different floors of the building to send a signal to the shut-off valve 10 when the temperature on that floor or in that vicinity reaches a predetermined temperature. This signal would actuate the removal of the shear pin 60 or the delivery of sufficient fluid pressure to fracture the shear pin 60. One way in which such automated actuation could occur is to utilize a pressure cartridge, a heating element, pyrotechnic gas generator hydraulic accumulator or compressed gas source of some type in the fluid fitting 68. The signal received from the temperature-sensing device could also be used to turn on an oil pump or compressor to deliver the fluid pressure to the housing chamber 44a.

The emergency gas shut-off valve 10 in accordance with the present invention is constructed so that it is not easily reloaded by individuals who are unauthorized to restore the supply of fuel to a dwelling. This is an important feature because it will prevent building owners and other unauthorized personnel from re-establishing the supply of fuel to the dwelling without the consent and permission of the gas company. In this manner, gas company personnel can ensure that everything which concerns the supply of fuel to the dwelling is in safe operating condition. The gas company can also refuse to restore the supply of fuel to the dwelling until such time as the building owner pays all arrearages.

FIGS. 5 and 6 illustrate the reloading operation of shut-off valve 10. Thus, a reloading tool 80 is provided for resetting the valve member 48 in its spring-loaded normally open position. The reloading tool 80 includes a puller 82 having a threaded portion 82a at the bottom thereof and a retaining pin 82b and a puller knob 82c. The puller 82 is slideably disposed within a screwjack 84 which is threadedly disposed in body 86. A screwjack knob 84a includes a bushing 84b through which the puller 82 is disposed. The retaining pin 82b permits the puller 82 from sliding out of the screwjack 84.

The reloading tool 80 is placed over the sleeve 56, in which the strike pin 58 is disposed when the valve member 48 is in the closed position, and the threaded portion 82a is threaded into the recessed female threads 59 of the strike pin 58, as shown in FIG. 5. Preferably, the recessed female threads 59 and the threaded portion 82a comprise a left-handed threading arrangement. The screwjack knob 84a is then turned in the counterclockwise position, the screwjack 84 having a conventional right-handed threading arrangement within the body 86, so that the body 86 bears against the sleeve 56 and the strike pin 58 is forcibly drawn from within the sleeve 56. Once the strike pin 58 has been pulled from the sleeve 56, as shown in FIG. 6, a new shear pin 60 can be asserted through the aligned transverse openings in the sleeve 56 and the strike pin 58. Once the new shear pin 60 has been inserted within the aligned transverse openings, the reloading tool 80 can be removed and the valve member 48 is once again in its spring-loaded normally open position to permit the supply of fuel to the dwelling.

It will be recognized that the volume of the housing chamber 44a will be reduced upon the reloading of the valve member 48. Thus, some of the oil in the housing 44 after fluid pressure actuation will escape through pressure line 20 unless the fitting 68 is removed and the oil drains through the fluid inlet port in the valve housing 44. It is important to note that a small amount of oil may remain in the cup portion of valve member 48 after reloading without any effect on the operation of the shut-off valve 10.

It is therefore readily apparent that the shut-off valve 10 in accordance with the present invention does not affect the gas service line 12 or the gas meter 16 so that it can be easily reset for providing its life and property-saving function. A fluid fitting 68 having the burst disk 70 welded therein can also be replaced quite easily if the shut-off valve 10 had been actuated by the fluid pressure actuating means.

Thus, a shut-off valve for use in connection with an emergency gas shut-off system for office and apartment dwellings has now been described. It is important to note that the shut-off valve 10 in accordance with the present invention can be used to terminate the supply of any type of fuel to a dwelling and can be installed anywhere in the fuel service line between the main fuel source and the fuel meter or other main distributing device in a dwelling.

While the foregoing description and figures illustrate one preferred embodiment of the emergency gas shut-off valve in accordance with the present invention, it should be appreciated that certain modifications are made and encouraged to be made in the materials used as well as the structural and functional aspects of the disclosed embodiment without departing from the spirit and scope of the present invention which is defined by the claims which are set forth immediately hereafter.

What is claimed is:

1. A shut-off valve for terminating the supply of fuel to the main service in a building, said shut-off valve comprising:
   a. a valve body for connection in a fuel supply line between a main fuel supply and the main service in a building, said valve body having a first end, a second end and a fuel conduit extending between said first and second ends;
   b. a valve member operatively associated with said fuel conduit to permit fuel to pass from said first end to said second end of said valve body when in an open position and to block said fuel conduit when in a closed position thereby preventing fuel from passing from said first end to said second end of said valve body;
   c. a valve-closing means for moving said valve member from said open position to said closed position, said valve-closing means being adapted to be activated from a location remote from said shut-off valve;
   d. a shear member operatively associated with said valve member and said valve-closing means to maintain said valve member in said open position, said shear member being so constructed and arranged with respect to said valve-closing means that said shear member must fail to permit said valve-closing means to move said valve member from said open position to said closed position; and
   e. manual actuation means operatively associated with said shear member, said manual actuation means being adapted to exert a force against and fracture said shear member so that said shear member fails, thereby permitting said closing means to move said valve member to said closed position by actuation at a location adjacent to said shut-off valve as well as a location remote from said shut-off valve, wherein said manual actuation means must move from a first position to a second position when said shear member fails, regardless of the manner in which said shear member fails.

2. The shut-off valve claimed in claim 1, wherein said valve-closing means is fluid-activated, and said fluid-activated valve-closing means is adapted to receive fluid pressure from a fluid pressure line having a first end connected to said shut-off valve and a second end connected to a fluid pressure fitting at a location remote from said shut-off valve.

3. The shut-off valve claimed in claim 1, wherein said valve-closing means is fluid-activated, and said fluid-activated valve-closing means includes a fluid pressure line for delivering fluid pressure thereto, said fluid pressure line having a first end connected to said shut-off valve and a second end connected to a fluid pressure fitting at a location remote from said shut-off valve.

4. The shut-off valve claimed in claim 3, wherein said fluid pressure fitting is located outside the building.

5. The shut-off valve claimed in claim 2, wherein a fluid pressure of at least 1,000 psi must be exerted to fracture said shear member so that said valve-closing means can move said valve member to said closed position, thereby dissuading unauthorized personnel from activating the valve-closing means with unauthorized activation means.

6. The shut-off valve claimed in claim 5, wherein a fluid pressure no greater than 3,000 psi must be exerted to fracture said shear member so that said valve-closing means can move said valve member to said closed position, thereby enabling authorized personnel to manually activate the valve-closing means with authorized equipment.

7. The shut-off valve claimed in claim 2, wherein said fluid-activated valve-closing means includes a burst disk which must be ruptured in order to deliver fluid pressure to move said valve member.

8. The shut-off valve claimed in claim 1, wherein a force of at least 1,000 psi must be exerted against said shear member to structurally fracture said shear member.

9. The shut-off valve claimed in claim 1, including actuating means for moving said valve member to said closed position when the environment at a location inside a building and remote from said shut-off valve reaches a predetermined temperature level.

10. The shut-off valve claimed in claim 9, wherein said actuating means is adapted to receive a signal from a temperature sensing device located in an area of the dwelling which is remote from said shut-off valve.

11. The shut-off valve claimed in claim 10, wherein said valve-closing means includes means operatively associated with said actuating means to activate said valve-closing means upon receiving a signal from the temperature sensing device.

12. The shut-off valve claimed in claim 1, wherein said valve member includes a custom reload structure adapted to be engaged by a mated reloading tool so that said valve member can only be reset from said closed position to said open position by using the mated reloading tool.

13. The shut-off valve claimed in claim 12, wherein said valve member is adapted to be reset by replacing said shear member after it has been sheared when said valve member has been drawn to said open position by the reloading tool.

14. The shut-off valve claimed in claim 1, wherein said valve-closing means is substantially self-contained within said valve body.

15. The shut-off valve claimed in claim 1, wherein said shear member is meltable so that when said shear member is exposed to excessive heat it fails, thereby permitting said valve-closing means to move said valve member to said closed position.

16. The shut-off valve as claimed in claim 15, wherein said shear member is adapted to receive heat electrically from a location remote from said shut-off valve.

17. The shut-off valve claimed in claim 1, wherein said shear member connects said valve member and said valve body such that the shear member bears against said valve body to prevent said valve member from being moved to said closed position.

18. The shut-off valve claimed in claim 17, wherein said shear member has a longitudinal axis, and is disposed such that said longitudinal axis is transverse to the direction of movement of the valve member from said open position to said closed position.

19. The shut-off valve claimed in claim 1, wherein said valve-closing means is adapted to be activated from a location outside the building.

20. A shut-off valve for terminating the supply of fuel to the main service in a building, said shut-off valve comprising:
 a. a valve body for connection in a fuel supply line between a main fuel supply and the main service in a building, said valve body having a first end, a second end and a fuel conduit extending between said first and second ends;
 b. a valve member disposed is said valve body and being operatively associated with fuel conduit to permit fuel to pass from said first end to said second end of said valve body when in an open position and to block said fuel conduit when in a closed position thereby preventing fuel from passing from said first end to said second end of said valve body;
 c. a piston rod operatively associated with said valve member, said piston rod being adapted to extend through said valve body when said valve member is in said open position and to be substantially within said valve body when said valve member is in said closed position, whereby said piston rod serves as a visual indicator to indicate the position of said valve member and as a manual actuator to facilitate the movement of said valve member to said closed position when said piston rod is struck with sufficient impact; and
 d. valve-closing means for moving said valve member from said open position to said closed position, said valve-closing means being adapted to be activated at either a location adjacent to said shut-off valve or at a location remote from said shut-off valve.

21. The shut-off valve claimed in claim 20, including biasing means for urging said valve member towards said closed position and a shear pin extending transversely through said piston rod so that said valve member is maintained in the open position against the biasing force of said biasing means unless said shear pin fails by a force exerted thereagainst.

22. The shut-off valve claimed in claim 21, wherein a fluid pressure of at least 1000 psi must be exerted to structurally destroy said shear pin.

23. The shut-off valve claimed in claim 21, wherein a fluid pressure of not more than 3000 psi must be exerted to structurally destroy said shear pin.

24. The shut-off valve claimed in claim 21, wherein said shear pin is made of a material which can withstand temperatures of at least 160° F.

25. The shut-off valve claimed in claim 24, wherein said shear pin will fail at approximately 380° F., thereby causing said biasing means to move said valve member to said closed position.

26. The shut-off valve as claimed in claim 25, wherein said shear member is adapted to receive heat electrically from a location remote from said shut-off valve.

27. The shut-off valve claimed in claim 21, wherein said shear pin is made of a polyetherimide plastic material.

28. The shut-off valve claimed in claim 21, wherein said shear pin is made of ULTEM 1000.

29. The shut-off valve claimed in claim 21, wherein said valve member includes a reload structure adapted to be engaged by a mated reloading tool so that said valve member can only be reset from said closed position to said open position by using the mated reloading tool.

30. The shut-off valve claimed in claim 29, wherein said valve member is adapted to be reset by replacing said shear member after it has been destroyed when said valve member has been drawn to said open position by the reloading tool.

31. The shut-off valve claimed in claim 20, including a shear member operatively associated with said valve member and said valve-closing means to maintain said valve member in said open position, said shear member being destructible when a force is exerted thereagainst so as to permit said valve-closing means to move said valve member to said closed position.

32. The shut-off valve claimed in claim 31, wherein said shear member is so constructed and arranged that it is necessary that said shear member fail to permit said valve-closing means to move said valve member to said closed position.

33. The shut-off valve claimed in claim 32, wherein said shear member is meltable as well as destructible so that said shear member can fail by excessive heat as well as by excessive force.

34. A shut-off valve for terminating the supply of fuel to the main service in a building, said shut-off valve comprising:
   a. a valve body for connection in a fuel supply line between a main fuel supply and the main service in a building, said valve body having a first end, a second end and a fuel conduit extending between said first and second ends;
   b. a valve member operatively associated with said fuel conduit to permit fuel to pass from said first to said second end of said valve body when in an open position and to block said fuel conduit when in a closed position thereby preventing fuel from passing from said first to said second end of said valve body;
   c. fluid-activated valve-closing means for moving said valve member from said open position to said closed position, said fluid-activated valve-closing means being adapted to be activated from a location outside the building, said fluid-activated valve-closing means having a fluid pressure line for delivering fluid pressure thereto, said fluid pressure line having a first end connected to said shut-off valve and a second end connected to a fluid pressure fitting at a location outside the building, said fluid-activated valve-closing means being so constructed and arranged with respect to said valve body and said valve member such that when said valve-closing means is activated, fluid pressure is exerted against said valve member within said valve body to move said valve member from said open position to said closed position.

35. The shut-off valve claimed in claim 34, wherein said valve body has a fluid pressure chamber separated from said fuel conduit, said fuel pressure chamber being adapted to receive fluid for the exertion of pressure against said valve member.

36. The shut-off valve claimed in claim 35, including biasing means in said fluid pressure chamber to normally bias said valve member towards said closed position, and a shear member operatively associated with said valve member and said valve body to maintain said valve member in said open position against the biasing force of the biasing means in the fluid pressure chamber, said shear member and said biasing means being so constructed and arranged with respect to one another that when sufficient fluid pressure is exerted against said valve member to structurally destroy said shear member, said biasing means moves said valve member to said closed position.

37. The shut-off valve claimed in claim 36, wherein said shear member is meltable as well as destructible so that said shear member can fail by excessive heat as well as by excessive force.

38. The shut-off valve claimed in claim 37, including impact actuation means operatively associated with said shear member so that said shear member can be structurally destroyed by striking said impact actuation means with sufficient force.

39. The shut-off valve as claimed in claim 37, wherein said shear member is adapted to receive heat electrically from a location remote from said shut-off valve.

* * * * *